Jan. 30, 1962    V. ST. C. MONTEITH ETAL    3,018,511
TIRE APPARATUS
Filed Nov. 19, 1959    2 Sheets-Sheet 1

Fig. I

INVENTORS
Victor St.C. Monteith
Charles G. Wyman
BY
Reuben Wolk
Attorney

Jan. 30, 1962   V. ST. C. MONTEITH ETAL   3,018,511
TIRE APPARATUS

Filed Nov. 19, 1959

INVENTORS
Victor St. C. Monteith
Charles G. Wyman
BY

Reuben Wolk
Attorney

United States Patent Office 3,018,511
Patented Jan. 30, 1962

3,018,511
TIRE APPARATUS
Victor St. C. Monteith and Charles G. Wyman, Dayton, Ohio, assignors, by mesne assignments, to The Dayton Tire & Rubber Company, Dayton, Ohio, a corporation of Ohio
Filed Nov. 19, 1959, Ser. No. 854,187
4 Claims. (Cl. 18—2)

This invention relates to an improved tire apparatus and particularly an apparatus used in the manufacture of tires having nylon cords.

Modern day passenger automobile tires are fabricated with cord or fabric reinforcements. This reinforcement may be of rayon or nylon but nylon is widely used today in order to improve the high-speed characteristics of tires and improve resistance to deterioration and impact. Under the conventional method of manufacturing tires the rubber and fabric materials are built up on a drum and then placed within a mold where they are cured at a temperature of about 285 to 300 degrees Fahrenheit, the tires are then removed from the mold and placed on the assembly line. It has been found, however, that tires manufactured in this manner containing the nylon material have a tendency to grow which causes tire failure because of the strain under which the rubber is placed. This in turn can cause cracks in the tread channels, enlarge small cuts, and induce ply separation. The reason for this growth has been traced to the aforesaid method involving the removal of the tire from the mold because the tire will contract after such removal. It is also during this removal that a final cure occurs and thus the finished tire will have a size which is less than that attained within the mold. Thus, when the tire is placed in service on the automobile it must grow back to the mold size, placing the cured rubber under tension, and making it susceptible to cuts, etc. as stated above. Often this growth may be as great as seven percent.

In order to overcome this growth problem, the tire industry has developed the technique known as "post inflation," which simply involves the process of removing the tire from the mold while still hot and inflating it under a pressure of about 50 pounds per square inch. Since the tire is still hot, it cures at the same dimensions that it had within the mold instead of shrinking. In view of the fine results obtained by a process such as this, tire manufacturers have been utilizing this post inflation method for many years.

This invention refers to an apparatus which provides for post inflation and at the same time permits the process to take place under conditions which are safe for the operator. The apparatus consists of a stand containing a simulated wheel rim upon which the tire may be placed immediately upon removal from the mold. At the same time the apparatus consists of a guard which is placed in front of the tire in order to prevent it from blowing off the rim and thus injuring the operator, the operation of the guard simultaneously actuating the pressure means which provides for the inflation of the tire upon the apparatus.

It is a primary object of this invention to provide an apparatus for post inflating tires.

It is a further object of this invention to provide such an apparatus which is simple to operate.

It is another object of the invention to provide a safety device in conjunction with the device which protects the operator.

It is another object of the invention to provide an automatic control device which provides the post inflation pressure to the tire when the operator actuates the safety means.

These and other objects of the invention will be more readily apparent in the following specification, claims and drawings, in which:

Figure 1:
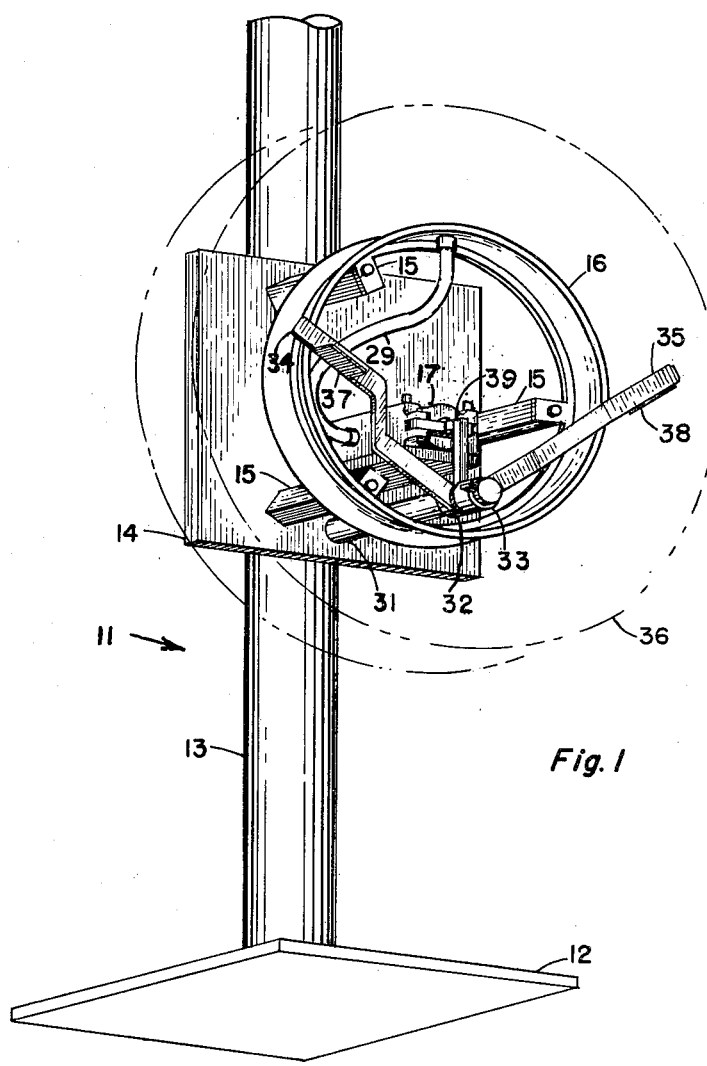
FIGURE 1 is a perspective view of the novel apparatus.
Figure 2:
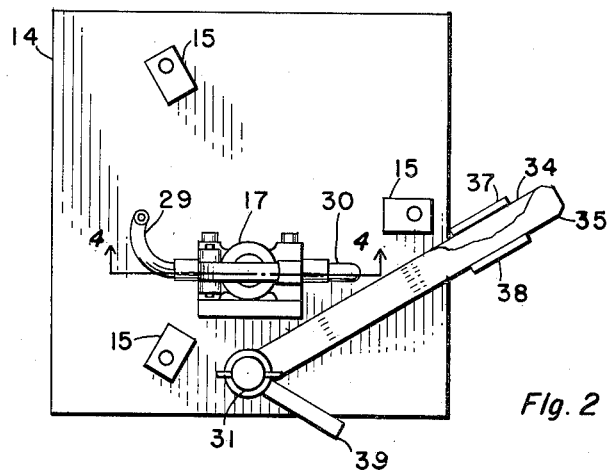
FIGURE 2 is an elevational view of a portion of the apparatus illustrating the safety device and the air pressure control system before the tire is placed upon the apparatus.
Figure 3:
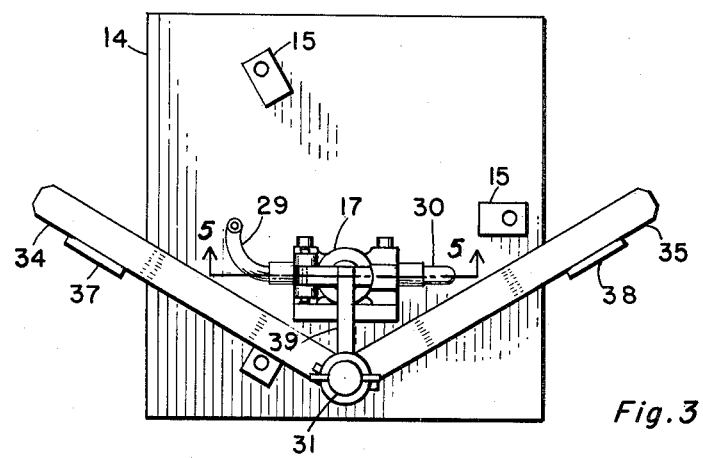
FIGURE 3 is a view similar to FIGURE 2 indicating the apparatus in position for inflation.
Figure 4:
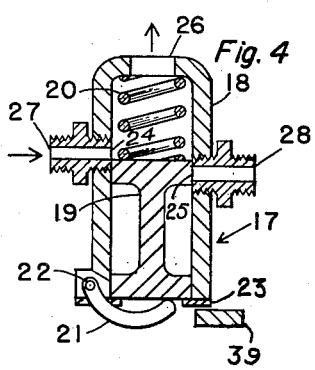
FIGURE 4 is sectional view taken along line 4—4 of FIGURE 2 and illustrating the valve mechanism before the tire is placed on the apparatus.

Referring now to FIGURE 1, reference numeral 11 indicates the apparatus for post inflating the tire. This apparatus consists of a base or a platform 12, a vertical cylindrical post 13 extending at right angles from the base, and a plate 14 mounted upon the post. Mounted on the face of the plate 14 and extending outwardly therefrom are three support members 15 to which is mounted a rim 16 by means of rivets, screws, welding or other conventional fastening means. This rim 16 simulates a tire rim such as used in passenger automobiles. Also mounted on the plate 14 is a valve assembly 17 which is more fully illustrated in section in FIGURES 4 and 5. As best shown in these figures, the assembly includes a cylinder 18 and a dumbbell type piston 19 slidably mounted therein. A compression spring 20 mounted within the cylinder 18 is biased to urge the piston 19 downwardly as shown in FIGURE 4. The piston is retained at its maximum outward position of FIGURE 4 by means of armh 21 which is pivotally mounted at 22 to the cylinder. The arm 21 in turn is prevented from passing beyond the position shown in FIGURE 4 by means of the shoulder 23 also mounted on the cylinder wall. The cylinder has three apertures 24, 25, and 26 for the entrance and removal of air. The aperture 24 is fitted with a fitting 27 and the aperture 25 with a fitting 28 for facilitating attachment to air hoses 29 and 30 respectively as shown in FIGURES 2 and 3. The aperture 26 is mounted against the plate 14 which has a similar aperture for permitting the exhaust of air through aperture 26 to the atmosphere.

Also mounted on the plate 14 and extending at right angles from the lower portion of the face thereof is a post 31. The outer end of this post has a bearing surface 32 and an end 33 upon which are mounted arms 34 and 35 respectively. These arms are spaced from the plate 14 sufficiently far so that they are in front of at least a portion of the tire (designated in phantom by reference numeral 36 in FIGURE 1). Mounted upon the arm 34 is a shorter arm 39 which is capable of oscillating together with the arm 34. Although the arm 34 is capable of oscillation upon the bearing 32, the arm 35 is fixed mounted upon the end 33 of the support 31. The arms 34 and 35 also have flanges 37 and 38 extending horizontally therefrom for purposes to be later described.

Operation of the apparatus

Figure 5:
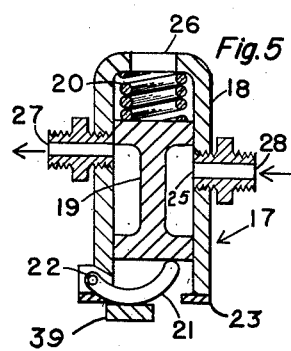
FIGURE 5 is a view similar to FIGURE 4 taken along the line 5—5 of FIGURE 3 and illustrating the valve positioned when the tire is placed upon the apparatus.

When the tire is removed from the mold the arms are both in the righthand position shown in FIGURE 2 and the tire is then placed upon the rim 16 without interference. The operator will then take the arm 34 and oscillate it to the left to the position shown in FIGURES 1 and 3, thus placing the arm in guard position. In so doing the shorter arm 39 is also oscillated to the left until it rides across the front of the arm 21 which then swings about its pivot point 22 and forces the cylinder 19 inwardly against the biasing force of the spring 20. This position is now shown in FIGURES 3 and 5. As can be seen in FIGURE 5, the action of the dumbbell piston frees the apertures 24 and 25 so that air which is available from a source (not shown) through hose 30 is passed through the hose connection 28 into aperture 25, through the cylinder 18 and then out the aperture 24 and the fitting 27 and as shown by the direction of the arrows in FIGURE 5. The air will then continue to pass through the hose 29 into the rim 16 where it inflates the tire at a pressure of approximately 50 pounds p.s.i. The tire is held on the rim until it has cooled sufficiently to overcome the problems described above, usually below 200 degrees Fahrenheit. When the tire is in the position as is shown in FIGURE 1, both the arms 34 and 35 are in front of at least part of the tire to provide a guard in the event a defect in the tire causes the tire to blow off the rim. By means of these arms, therefore, the operator or the surrounding machinery is prevented from injury or damage which might occur if such protection were not available.

When cooling has been completed the operator will oscillate the arm 34 to the right again, preferably by grasping the flange 37 and in so doing the arm 39 is removed from in front of the arm 21, allowing the biasing spring 20 to again return the dumbbell piston to the position shown in FIGURE 4. The inner end of the piston covers the aperture 25 but allows the aperture 27 to be free so that the air can be removed from the tire. This is accomplished by again returning the air through hose 29, fitting 27 and aperture 24, then out aperture 26 and through the matching hole in the plate 14 to the atmosphere. It should be noted that during the other position of the valve as shown in FIGURE 5 the dumbbell piston has blocked passage to the atmospheric aperture 26 in order that none of this air may inadvertently leak out to the atmosphere. After a few seconds for the air to be removed, the tire is then taken from the rim and placed in the next position on the assembly line.

It can thus be seen that by means of this novel invention a very simple apparatus for post inflating tires is devised. This apparatus permits simple installation and removal of the tire while providing in addition protection to the operator or surrounding machinery in the event a defect in the tire causes it to burst. While the apparatus has been shown in specific detail, we do not intend to be limited by these details but to obtain protection within the scope of the invention.

We claim:
1. Apparatus for inflating tires after curing, comprising a support, a rim on said support, valve means associated with said rim and adapted to transmit air to said rim, and a guard mounted on said support and spaced axially from said rim, said guard comprising a portion pivotal transversely of said rim and having means to actuate said valve when said portion is pivoted, to transmit air to said rim.

2. Apparatus for inflating tires after curing, comprising a support, a rim on said support, valve means associated with said rim to block or transmit air to said rim, and a guard mounted on said support and spaced axially from said rim, said guard comprising a portion pivotal transversely of said rim, and an arm on said portion to actuate said valve when said portion is pivoted, to transmit air to said rim.

3. In an apparatus for inflating tires after curing, comprising a support, a rim and valve means associated with said rim to transmit air to said rim, the improvement comprising a guard mounted on said support and axially in front of said rim, said guard having a pair of arms, one of said arms pivotal transversely of said rim to actuate said valve and transmit air to said rim.

4. Apparatus according to claim 1, wherein said valve means comprises a normally closed air inlet, and means within said valve means actuated by said pivotal guard portion to open said air inlet and to transmit air to said rim.

References Cited in the file of this patent
UNITED STATES PATENTS

| | | |
|---|---|---|
| 2,415,462 | Cherry et al. | Feb. 11, 1947 |
| 2,710,054 | Merriman | June 7, 1955 |
| 2,835,318 | Conger | May 20, 1958 |
| 2,881,825 | Engstrom | Apr. 14, 1959 |

FOREIGN PATENTS

| | | |
|---|---|---|
| 890,906 | France | Feb. 22, 1944 |